Oct. 12, 1926.

H. D. PALMER 1,603,095

PNEUMATIC TIRE CARRIER FOR AUTOMOBILE TRUCKS

Filed July 12, 1923

Inventor
Herman D. Palmer
By Chindahl, Parker & Carlson
Attys

Patented Oct. 12, 1926.

1,603,095

UNITED STATES PATENT OFFICE.

HERMAN D. PALMER, OF HARTFORD, WISCONSIN, ASSIGNOR TO THE KISSEL MOTOR CAR COMPANY, OF HARTFORD, WISCONSIN, A CORPORATION OF WISCONSIN.

PNEUMATIC-TIRE CARRIER FOR AUTOMOBILE TRUCKS.

Application filed July 12, 1923. Serial No. 650,987.

The invention relates to automobile trucks of the type which are equipped with pneumatic tires; and the invention has for its aim the provision in such trucks of means of an advantageous character for carrying one or more spare tires. Heretofore such tires have been carried upon the truck platform, upon the stepboard or by brackets beneath the rear end of the truck body. In the first case the tires, unless protected by a partition, are apt to become injured by the load; or, if protected, they have to be lifted out over the partition, which is laborious. In the second case, the tires are in the way, and in most instances the stepboards are not strong enough to sustain the weight. In the third case, the tires are exposed to mud and moisture, and the added weight back of the rear axle is objectionable.

The object of my invention is to provide a tire carrier effectually overcoming the above difficulties; and in attaining this result I utilize a space between the forward end of the loading platform and the supporting frame by providing a relatively flat box adapted to completely enclose one or more tires, and slightly altering the construction and arrangement of the supporting framework to accommodate this box.

Figure 1:
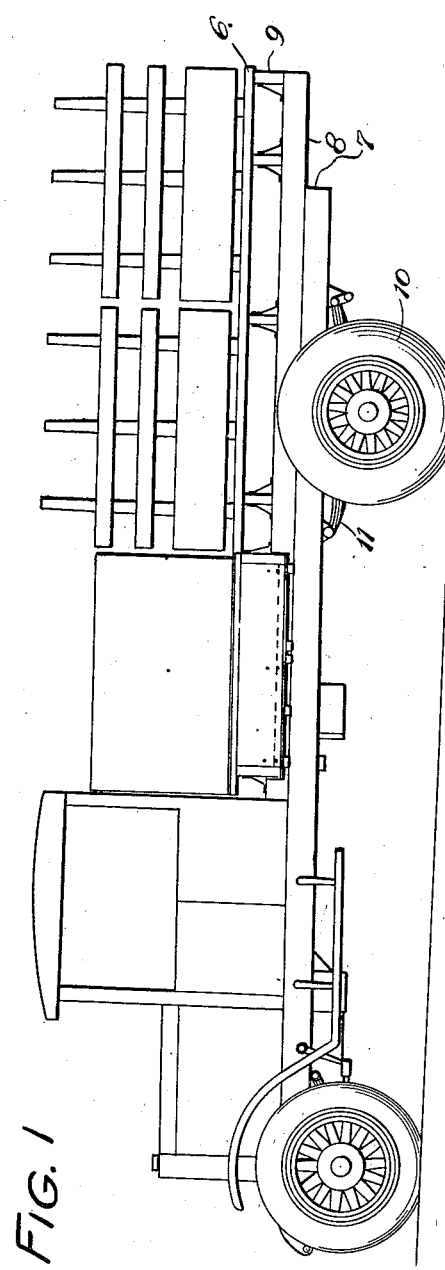
Figure 2:
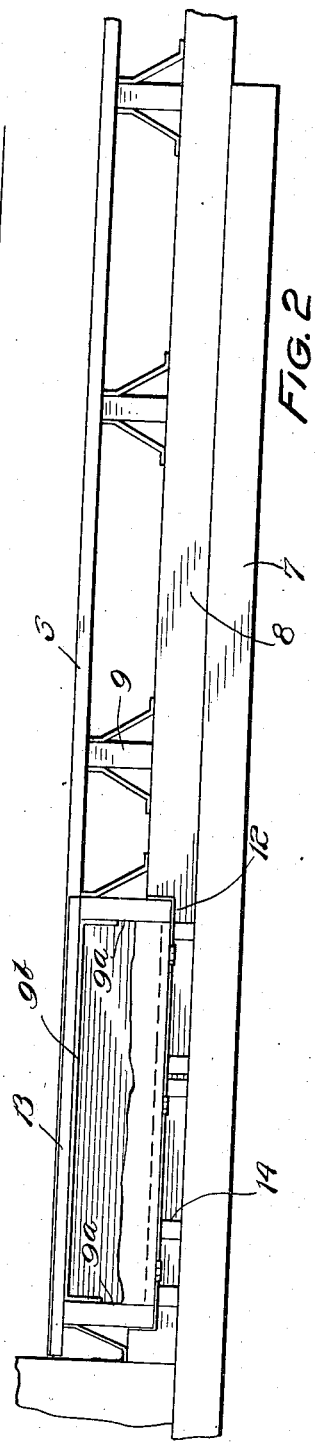
Figure 3:
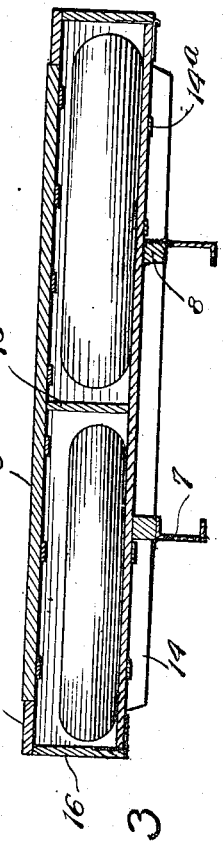

In the accompanying drawings I have illustrated a preferred form of the invention as applied to an automobile truck. Fig. 1 is a side elevational view of such a truck equipped with my improved tire carrier. Fig. 2 is a fragmentary side elevational view of the chassis frame and the truck platform with the tire carrier located therebetween near the forward end of the platform. Fig. 3 is a transverse sectional view through the forward end of the platform, the chassis frame and carrier.

The truck herein shown for purposes of illustration is of usual construction, including a loading platform 6 supported upon a chassis frame 7 through the medium of a pair of longitudinal frame members or rails 8 and transverse sills 9. Said sills 9 are of substantial height so as to support the platform 6 a substantial distance above the tops of the rear wheels 10. The latter as is usual, are supported upon the chassis frame through the medium of springs 11.

The tire carrier comprises, in the present instance, simply a box of which the top is formed principally by the platform 7. The bottom of the box is made of a width slightly greater than the platform and is supported upon the forward ends of the longitudinal rails 8. The latter, being formed of wood, are cut away as at 12 to increase the space for the box, the front and rear walls of which are formed by sills $9^a$ which are made of a height somewhat greater than the height of the sills 9 because of the cut-away portions of the rails 8. These sills $9^a$ are preferably tied together by means of iron straps $9^b$ secured upon the underside of the platform.

Upon each side edge of the platform there is provided a strip 13 to increase the width of the top of the box to that of the bottom. These strips 13 may be suitably secured in position by being fastened at their opposite ends upon the sills $9^a$. In addition to the support for the bottom of the box provided by the rails 8, I preferably employ a plurality of cross members 14, and the bottom is preferably further secured by straps $14^a$.

Preferably I divide the box into two compartments, one for a front tire and one for a rear tire. This is accomplished by means of a central or intermediate partition 15, and each compartment is provided at opposite sides of the box with a hinged door 16.

It will be observed that I have provided a very convenient means for carrying two spare tires for automobile trucks employing pneumatic tires; and that in so doing I have utilized space which heretofore has been entirely wasted. At the same time the added cost of construction is practically negligible, while a substantial advantage is gained by reason of the protection afford by the enclosing compartments.

I claim as my invention:—

1. In an automobile truck, the combination with a chassis frame, a load-carrying platform, means for supporting said platform above and in spaced relation to the chassis frame including a pair of longitudinal supporting members adapted to be mounted upon the chassis frame, and means forming a compartment beneath said platform for receiving pneumatic tires, said longitudinal members being cut away at their forward ends to receive the lower portion of said compartment.

2. In an automobile truck, the combination with a chassis frame of a load-carrying platform, means for supporting said platform above said frame including a pair of longitudinal supporting members mounted on said frame and a plurality of transverse sills on said members, and means providing a tire-carrying compartment beneath the forward end of said platform between two of said sills, said supporting members having cut away portions at their forward ends to receive the bottom portion of the compartment, the depth of said compartment being substantially greater than the vertical distance between said platform and the uncut portions of said supporting members.

In testimony whereof, I have hereunto affixed my signature.

HERMAN D. PALMER.